May 26, 1931.                J. S. CAMPBELL                1,806,840
                           ANTISKID CHAIN HOLDER
                            Filed May 4, 1929
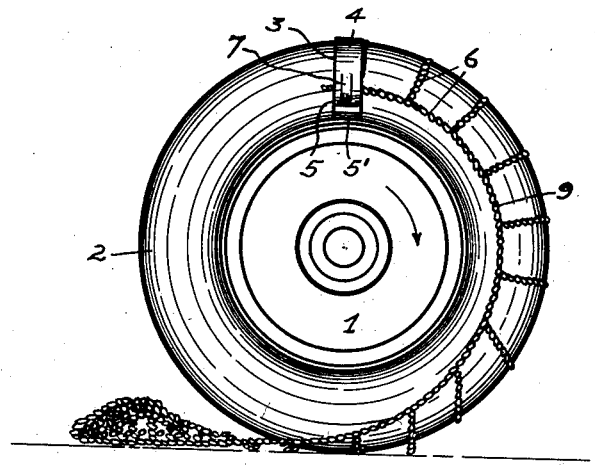
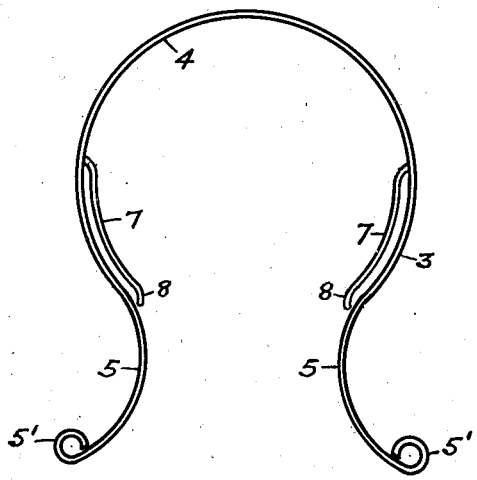  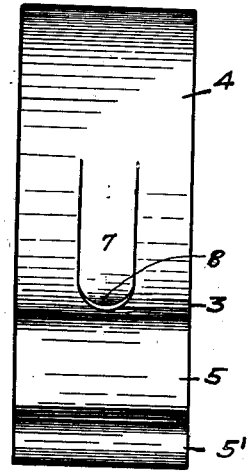
INVENTOR
John S. Campbell
By Jack Snyder
Attorney Patented May 26, 1931

1,806,840

UNITED STATES PATENT OFFICE

JOHN S. CAMPBELL, OF PITTSBURGH, PENNSYLVANIA

ANTISKID CHAIN HOLDER

Application filed May 4, 1929. Serial No. 360,406.

My invention relates to an anti-skid chain holder and important objects thereof are to provide a holder of the character described which will temporarily hold one end of an anti-skid chain to a motor vehicle tire to facilitate the positioning of the anti-skid chain to the latter, which may be readily clamped in the holding position to a motor vehicle tire or removed therefrom, and which embodies novel means for attaching an end of the anti-skid chain therewith.

Further objects of the invention are to provide a device of the class stated which is simple in its construction and arrangement, strong, durable and efficient in its use, positive in its action, compact, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a side view of a motor vehicle wheel having my improved chain holder mounted thereon.

Figures 2 and 3 are, respectively, enlarged end and side views of the device.

Referring in detail to the drawings 1 denotes an ordinary disc type motor vehicle wheel, including the usual tire 2.

My improved holder comprises an open clamp or body portion 3, which is constructed from a strip of resilient spring metal. The clamp 3 is substantially U-shaped with a rounded outer portion 4 and having its free inner end portion 5 flaring laterally outwardly. The free ends of the clamp 3 are rolled, as indicated at 5'. The clamp 3 is adapted for transversely overlapping and tensionally engaging the vehicle wheel tire 2. The flared end portions 4 and the rolled ends 5' thereof facilitate the positioning of the clamp 3 upon the tire 2.

The function of my improved clamp 3 is to temporarily hold one end of the anti-skid chain 6 while mounting the latter to the vehicle wheel tire 2. The rounded outer portion 4, of the clamp 3, is provided with a pair of oppositely disposed, horizontally aligned, fingers 7, which are preferably stamped directly from the clamp or body portion 1 and positioned to extend circumferentially parallel to respective adjacent side portions of the rounded outer clamp portion 4 on the inner side of the latter.

The fingers 7 are attached at their outer ends, and the inner free ends thereof are slightly curved laterally outward, as at 8, so as not to interfere with removal of the clamp 3 from the vehicle tire 2.

The fingers 7 are adapted for engaging the links at the ends of the side chains 9 of the anti-skid chain 6, to prevent the potential disengagement of the anti-skid chain 6 from the clamp 1 when the latter is mounted in position on the vehicle wheel tire 2.

In practice the use of my improved holder is as follows: The end links of the side chains 9 are first slipped over respective fingers 7 of the body portion 1, and the latter is then clamped transversely over the tire 2. The surplus of the anti-skid chain 6 is now piled forwardly of the wheel 1 and the latter then rotated thereover until the said chain surplus is disposed rearwardly of the wheel 1, as clearly shown in Figure 1. The end of the anti-skid chain 6 may now be readily connected together and the clamp 1 removed from the tire 2.

The present invention provides a most efficient device for facilitating and expediting the mounting of anti-skid chains to vehicle wheels, eliminates the use of a jack for such purposes, and permits of the positioning of the anti-skid chains without assistance.

What I claim is:

In combination a holder for anti-skid tire chains comprising a substantially U-shaped resilient clamp being adapted for transversely overlapping the tire and tensionally engaging the latter, a pair of fingers being stamped from the clamp side portions and further being disposed on the inner side of and carried by said latter for connecting the tire chain to said clamp, said pair of fingers extending parallel to the respective side portions of said clamp and having their free ends disposed outwardly toward respective side portions.

In testimony whereof I affix my signature.

JOHN S. CAMPBELL.